Oct. 1, 1968

C. M. HAWKINS 3,403,550

TORQUE INDICATOR

Filed Nov. 15, 1966

INVENTOR.
Cyril M. Hawkins
BY
F. J. Fodale
ATTORNEY

3,403,550
TORQUE INDICATOR

Cyril M. Hawkins, Indianapolis, Ind., assignor to General Motors Corporation, Detroit, Mich., a corporation of Delaware
Filed Nov. 15, 1966, Ser. No. 594,487
7 Claims. (Cl. 73—136)

My invention relates generally to torque indicators and more specifically to the general type of torque indicator which utilizes the wind-up of the power shaft under load with respect to a reference shaft as indicative of the torque loading on the power shaft.

A shaft under a torque loading will twist, the total angle of twist depending upon the torque being transmitted and the length from a fixed point at which the twist is measured. In a rotating shaft, the fixed point is determined by the point at which the reference and load shafts are fixed with the result that the total angle of twist or the wind-up between the power shaft and the reference shaft is directly proportional to the length between the point at which the power and reference shafts are connected and the point at which the relative angular displacement between the two shafts is measured. In some gas turbine or other similar installations, the length available between these two points is limited thereby producing an angular displacement which is of insufficient magnitude to be detected and read out to indicate the torque being transmitted within acceptable limits of accuracy. Accordingly, in its broadest aspects, my invention is directed to providing a torque meter in which the wind-up between the power shaft and the torque shaft is altered to yield a wind-up indication within acceptable accuracy ranges.

Another object of my invention is to provide a torque meter in which the wind-up between the power shaft and the reference shaft is multiplied to give a wind-up capable of detection within acceptable accuracy limits.

Another object of my invention is to provide a torque meter having acceptable accuracy for use in installations where a relatively short length between the point at which the reference shaft is connected to the power shaft and the point at which the wind-up of the power shaft with respect to the reference shaft is initially measured.

Another object of my invention is to provide a torque meter with the foregoing features which is of simple and uncomplicated structure.

The exact nature of this invention as well as other objects and advantages thereof will be readily apparent from consideration of the following specification relating to the annexed drawing in which.

Figure 1:
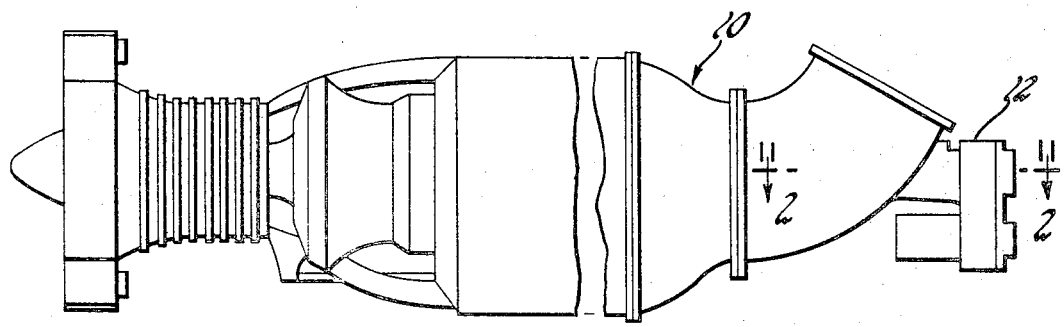
FIGURE 1 is an elevation view of a gas turbine engine provided with a gear box which includes a torque meter in accordance with my invention.
Figure 2:
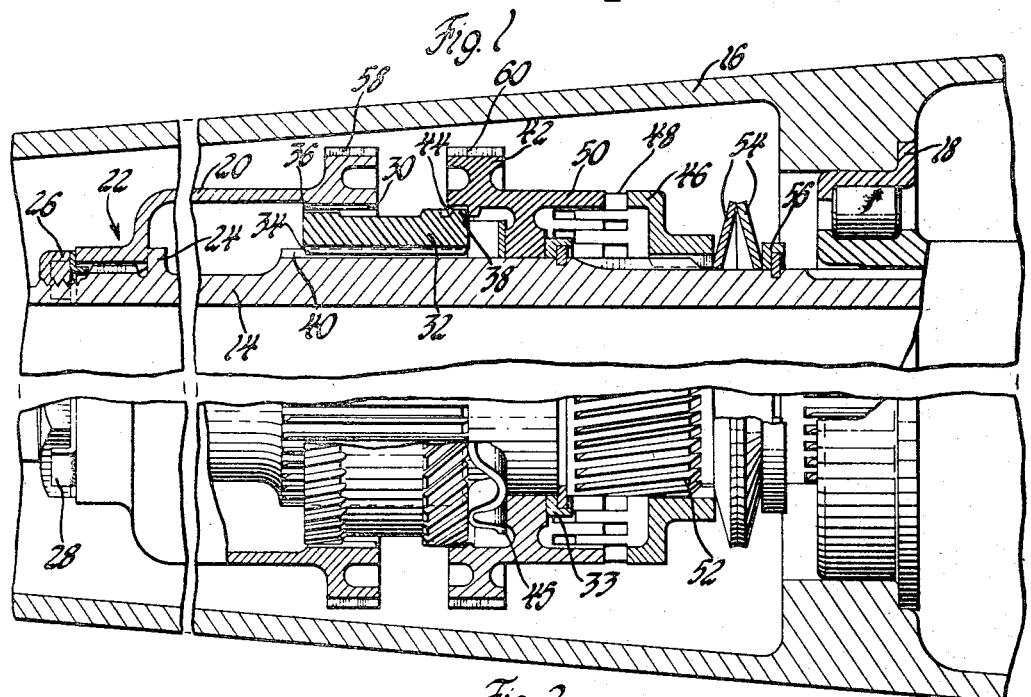
FIGURE 2 is a section view taken along the line 2—2 of FIGURE 1 showing the torque meter in accordance with my invention.

Referring now to the drawings and more particularly to FIGURE 1, there is shown a gas turbine engine indicated generally at 10. The gas turbine engine includes a gear box 12 which is driven by a power shaft directly from the turbine of the gas turbine engine 10. The power shaft is identified by the numeral 14 in FIGURE 2 and is rotatably mounted in the gear box casing 16 by cylindrical roller bearings; the aft bearing being shown at 18. The reference shaft 20 is suitably secured to the power shaft 14 for rotation with it at 22. In this particular instance, the reference shaft 20 is splined to the power shaft and fixed axially with respect to it between an annular collar 24 on the power shaft 14 and a nut 26 threaded to the shaft 14 and held against rotation by a lock washer 28. The right-hand or free end of the reference shaft 20 has internal helical splines 30. This portion of the reference shaft 20 is radially spaced from the power shaft 14 and an annular multiplier element 32 is disposed therebetween.

Figure 3:
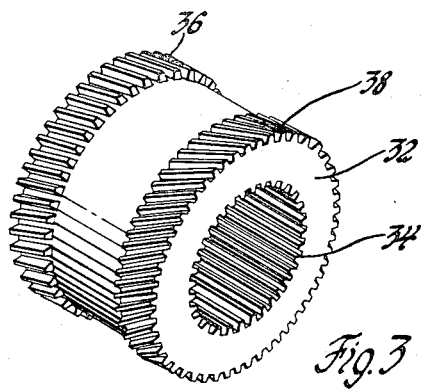
FIGURE 3 is a perspective view of the first torque responsive element which is utilized in my invention.

Referring momentarily to FIGURE 3, the annular multiplier element 32 is seen to comprise a sleeve having an internal set of straight splines 34 and two external sets of helical splines 36 and 38, respectively.

Returning to FIGURE 2, the straight splines 34 mesh with mating splines 40 of the power shaft 14 while the helical splines 36 mesh with the aforementioned internal splines 30 of the reference shaft 20. As thus far described, the motion multiplier element 32 is torque responsive and will move axially along the power shaft 14 in response to the wind-up of the power shaft with respect to the reference shaft 20. While in this particular instance. I have shown straight splines between the element 32 and the power shaft 14 and helical splines between the element 32 and the reference shaft 20, it is obvious that the splines could be reversed to yield the same effect. It is likewise obvious that both splines could be helical with the only requirement being that the helix angles be different so as to produce some axial motion in response to wind-up. However, the combination of straight and helical splines is preferred because this combination gives the most axial movement for a given helical angle.

A second annular member or exciter element 42 is journaled on the power shaft 14 to the right of the element 32 against a thrust ring 33. The exciter element 42 has internal helical splines 44 which mesh with the second set of splines 38 on the element 32. The helical splines 38, 44 as shown are of the same lead as the splines 30 and 36, however, they have a higher helix angle. It is obvious that the leads can be reversed so long as the helix angles are different. In the particular problem which my torque meter was designed to overcome, the wind-up was insufficient between the power shaft 14 and the reference shaft 20 to be measured accurately. The wind-up was, therefore, to be multiplied. Multiplication is accomplished in my invention by the splines 38 and 44 having a greater helix angle than the splines 30 and 36; the difference in helix angle depending among other factors on the amount of wind-up multiplication desired. Obviously if in a particular instance, the wind-up should be too great, it can be decreased simply by making the helix angle of the splines 38 and 44 lower than the helix angle of the splines 30 and 36. The element 42 is angularly displaced with respect to the power shaft 14 in response to the axial displacement of element 32.

A wave spring 45 is provided between the elements 32 and 42. This wave spring exerts an axial force on element 32 toward the left resisting its movement toward the right caused by wind-up. This action preloads the splines 34, 40, and 30, 36 to eliminate any backlash present in these splines due to machining tolerances and other dimensional errors inherent in manufacturing of all parts. To eliminate the backlash in splines 38 and 44, I have provided means to exert a torque on the member 42 in opposition to the angular displacement of the member 42 caused by wind-up between the power shaft 14 and the reference shaft 20. This means comprises a collar 46 having a plurality of circumferentially spaced axially extending teeth 48 which mesh with a like set of teeth 50 extending axially from the element 42. This connection allows relative axial movement between the members 42 and 46 while maintaining the torque load on the member 42. The torque load is produced by mounting the member 46 to the power shaft 14 with helical splines 52 and a set of back-to-back Belleville springs 54 disposed between the right-hand end of the member 46 and an abutment 56 on the power shaft 14. The springs 54 urge the member 46 to the left and due to the action of helical splines 52 also counterclockwise providing a torque preload which is transmitted to the member 42 through the teeth 48 and 50.

The operation of my device is as follows: The wind-up of the power shaft 14 under load with respect to the reference shaft 20 causes the first element 32 to move axially with respect to the shaft 14. This axial movement then imparts an angular displacement to the member 42. Due to the fact that the helix angle of the splines 38, 44 is greater than the helix angle of the splines 30, 36, the wind-up of the power shaft is multiplied so that the angular displacement of the member 42 with respect to the reference shaft 20 is greater than the relative twist between the power and reference shafts. The angular displacement of the member 42 with respect to the reference shaft can be detected and indicated in any suitable manner. One such method is to utilize a magnetic pickup to measure the angular displacement between teeth 58 and 60 on the reference shaft and the second element 42, respectively, which transmits this torque level information into a suitable electronic circuit capable of accurately indicating the torque within the range of angular displacement provided by the element 42.

Thus it can be seen that I have provided a torque meter in which the wind-up between the power and torque shafts can be altered.

Various modifications are contemplated and may obviously be resorted to by those skilled in the art without departing from the spirit and scope of the invention, as hereinafter defined by the appended claims, as only a preferred embodiment thereof has been disclosed.

I claim:
1. A torque indicator for a power shaft comprising in combination:
   a reference shaft concentric with said power shaft and secured thereto for rotation therewith, said power and reference shafts each having splines,
   a first element coaxial with said shafts and having first splines and second helical splines meshing individually with said power and reference shaft splines whereby said first element is axially movable in response to the wind-up between said power and reference shafts, said first element having third helical splines with a helix angle different from the helix angle of said second splines, and
   a second, annular element rotatably mounted coaxially with and fixed axially with respect to said power shaft, said second element having helical splines meshing with the third helical splines on said first element whereby the angular displacement of said second element is indicative of the wind-up between said power and reference shafts, and consequently, of the torque carried by said power shaft.

2. The torque indicator as defined in claim 1 including means to resist the angular displacement of said second element to eliminate backlash in said third splines.

3. The torque indicator as defined in claim 1 wherein said third splines have a greater helix angle than said second splines and wherein spring means are included to resist movement of said first element to eliminate backlash in said first and second splines.

4. The torque indicator as defined in claim 3 including means to resist the angular displacement of said second element to eliminate backlash in said third splines.

5. The torque indicator as defined in claim 3 including a third annular element helically splined to said power shaft, an abutment on said power shaft, spring means between said abutment and said third annular element and means to transmit torque from said third annular element to said second element whereby said second annular element is preloaded to eliminate backlash in said third helical splines.

6. The torque indicator as defined in claim 5 wherein said spring means comprises a pair of back-to-back annular springs and wherein said last-mentioned means comprises a set of circumferential teeth extending axially from each of said second and third elements, said sets of teeth meshing so as to allow relative axial displacement between said second and third elements.

7. A torque indicator for a power shaft comprising in combination:
   a reference shaft concentric with said power shaft and secured thereto for rotation therewith, said power and reference shafts each having splines,
   a first element disposed radially btween said shafts and having first straight splines and second helical splines meshing with said power and reference shaft splines, respectively, whereby said first element is axially movable in response to the wind-up between said power and reference shafts, said first element having third helical splines with a helix angle greater than the helix angle of said second splines,
   a second annular element journaled on said power shaft in axially fixed relation thereto, said second element having helical splines meshing with the third helical splines on said first element whereby the angular displacement of said second element is indicative of the wind-up between said power and reference shafts, and consequently, of the torque carried by said power shaft,
   an annular wave spring disposed between said first and second elements to resist the movement of said first element,
   a third annular element helically splined to said power shaft, said third element having circumferentially spaced teeth extending axially toward said second element and meshing with a complementary set of teeth extending from said second element,
   an abutment on said power shaft, and
   annular spring means surrounding said power shaft between said second element and said third element whereby a torque is transmitted to said second element to resist the angular displacement thereof whereby backlash in said third splines is eliminated.

References Cited

UNITED STATES PATENTS

| | | | |
|---|---|---|---|
| 3,253,658 | 5/1966 | Bradley | 73—136 XR |
| 3,339,405 | 9/1967 | McDowall | 73—136 |

RICHARD C. QUEISSER, *Primary Examiner.*

C. A. RUEHL, *Assistant Examiner.*